(12) United States Patent
McNeff et al.

(10) Patent No.: US 7,441,942 B2
(45) Date of Patent: Oct. 28, 2008

(54) SYSTEM AND METHOD FOR APPLYING AN ADDITIVE TO A MATERIAL STREAM

(75) Inventors: Larry C. McNeff, Anoka, MN (US);
Clayton V. McNeff, Andover, MN (US);
David J. Johnston, Anoka, MN (US);
Peter G. Greuel, Anoka, MN (US)

(73) Assignee: SarTec Corporation, Anoka, MN (US)

( * ) Notice: Subject to any disclaimer, the term of this patent is extended or adjusted under 35 U.S.C. 154(b) by 0 days.

(21) Appl. No.: 11/748,223

(22) Filed: May 14, 2007

(65) Prior Publication Data
US 2007/0211564 A1    Sep. 13, 2007

Related U.S. Application Data

(63) Continuation of application No. 10/440,432, filed on May 16, 2003, now abandoned.

(51) Int. Cl.
*B01F 15/02*    (2006.01)
*B05B 17/00*    (2006.01)
*A01K 5/00*    (2006.01)

(52) U.S. Cl. .................. 366/168.1; 366/172.1; 118/303; 118/324; 119/51.01; 119/902; 99/516

(58) Field of Classification Search .................. 366/101, 366/102, 106, 107, 137.1, 172.1, 279, 168.1; 118/303, 324; 119/902, 51.01; 99/473, 474, 99/475, 476, 516, 534
See application file for complete search history.

(56) References Cited

U.S. PATENT DOCUMENTS

| 2,216,921 A | 10/1940 | Marvel |
| 2,301,461 A | 11/1942 | Schnetz |
| 2,628,204 A | 2/1953 | Gray |
| 3,101,040 A | 8/1963 | Lanz |
| 3,130,070 A | 4/1964 | Potters et al. |
| 3,194,539 A | 7/1965 | Emile |
| 3,218,149 A | 11/1965 | Sproull et al. |
| 3,263,592 A | 8/1966 | Hickey et al. |
| 3,653,639 A | 4/1972 | Mueller |
| 3,822,056 A | 7/1974 | Hawes, Jr. et al. |

(Continued)

OTHER PUBLICATIONS

"Contra-Shear Technology, Twin Shaft Paddle Mixer-Application,"http://www.cstechnology.com.au/BAG/mixer/application.html, 1 page (printed May 13, 2003).
"Food Equipment Direct, wholesale pricing to the end user,"http://www.bakerymixers.com/database.cgi?Mode=View &Product_Code=60B, 1 page (printed May 13, 2003).
"Kelly Duplex Model 193 Paddle Mixer 69197-J00061, Carbon steel construction Aluminum full open top cover" 1 page (May 1999).

*Primary Examiner*—Tony G Soohoo
(74) *Attorney, Agent, or Firm*—Pauly, DeVries, Smith & Deffner, L.L.C.

(57) ABSTRACT

The present disclosure is generally directed to systems and methods for applying liquid feed additives to a feed composition. In one embodiment, the system has a spray housing defining a spray chamber located adjacent a mix housing carrying a material composition. The mix housing defines a mix chamber, which contains an actuating device, such as an auger, that moves the material stream through the mix chamber. The mix chamber and spray chamber are in fluid communication. A spray nozzle is coupled to the spray housing and in fluid communication with an air source and liquid additive tank. The spray nozzle sprays a fog of air and liquid additive through the spray chamber and into the mix chamber, which gets deposited on the passing feed stream.

18 Claims, 4 Drawing Sheets

U.S. PATENT DOCUMENTS

| | | |
|---|---|---|
| 4,018,426 A | 4/1977 | Mertz et al. |
| 4,168,674 A | 9/1979 | Futter |
| 4,183,675 A | 1/1980 | Zarow |
| 4,369,597 A | 1/1983 | Leep et al. |
| 4,527,902 A | 7/1985 | Christen |
| 4,627,338 A | 12/1986 | Sprott et al. |
| 4,846,053 A | 7/1989 | Lane et al. |
| 4,898,092 A | 2/1990 | Greer |
| 4,994,286 A | 2/1991 | Greer |
| 5,100,699 A | 3/1992 | Roeser |
| 5,135,174 A | 8/1992 | Chaplinsky |
| 5,194,275 A | 3/1993 | Greer |
| 5,200,033 A | 4/1993 | Weitzman |
| 5,332,311 A | 7/1994 | Volk et al. |
| 5,347,468 A | 9/1994 | Rupp et al. |
| 5,358,738 A | 10/1994 | Sawka |
| 5,401,534 A | 3/1995 | Bourreau et al. |
| 6,007,859 A | 12/1999 | Taylor et al. |
| 6,056,822 A | 5/2000 | Jefferson et al. |
| 6,099,159 A | 8/2000 | Yoshida et al. |
| 6,250,793 B1 | 6/2001 | Gian |
| 6,276,619 B1 | 8/2001 | Turk et al. |
| 6,328,798 B1 | 12/2001 | Bostrom et al. |
| 6,395,091 B1 | 5/2002 | Jefferson et al. |
| 6,551,401 B1 | 4/2003 | Winistorfer et al. |

SYSTEM AND METHOD FOR APPLYING AN ADDITIVE TO A MATERIAL STREAM

This is a continuation application of co-pending application Ser. No. 10/440,432, filed on May 16, 2003, which application is hereby incorporated by reference in its entirety.

FIELD OF THE INVENTION

This invention relates generally to the field of feed processing systems and more particularly to systems and methods for combining additives with feed.

BACKGROUND OF THE INVENTION

Many livestock producers use processed feed to raise livestock, such as poultry, cattle, swine, sheep and dairy and beef cattle, rather than unprocessed feed or allowing the animals to graze on open pastures. Processed feed allows producers to achieve greater production in less space and at lower operating costs. In addition to the advantage of raising a larger number of animals on less land, processed feed allows producers to tailor the feed's nutrition qualities for specific types of animals. Thus, not only can more animals be produced on less land, processed feed also enables the animals to grow larger and healthier.

Grain-processing facilities typically combine a number of ingredients, such as wheat, barley and corn, mix them together and mill them to produce an animal feed product. Many grain-processing facilities operate continuously, thus, the milled grain is often moved throughout the system by means of conveyers or augers. Once milled, the feed is subject to various refining processes. For example, the feed may be combined with other materials, cooked, dried or made into flakes or pellets. Often feed is combined with various additives, such as liquid additives, conditioners, supplements, medicines and micro ingredients. Typically, these additives are metered and mixed into the feed through direct liquid injection by means of a micro ingredient machine or a liquid chemical pump, and then they are mixed in large chambers or containers, as a batch process; this process often leads to uneven distribution of the additive on the feed.

Different additives require different processing. For example, certain additives are heat sensitive and must be added to the feed after it is cooked; other additives can be mixed with the feed at any appropriate time in the process.

Additives work optimally in certain animals at particular concentrations. Thus, it is desirable to efficiently and uniformly distribute the additives into the feed. Uniform distribution of the additive into the feed prevents the livestock from consuming too much or too little of the additive. For example, a feed with an uneven distribution may have negative effects on the animals to which it is fed because some animals may get fed too much additive while others get fed too little additive. The animals that ingest the feed with too high a concentration of additives may be harmed, or the excess additive may pass through the animal without achieving its desired effect. Likewise, an animal that ingests feed with too little an additive content is not receiving the benefits intended by the additive. Thus, efficient uniform application insures that the animals will ingest the proper amount of additive and the additive will perform optimally.

SUMMARY OF THE INVENTION

The present disclosure relates to a system and method for applying a liquid additive to a material stream. In one embodiment, the material stream enters a mix housing, which defines a mix chamber, and is pushed through the mix chamber by an actuating device contained therein. Adjacent the mix housing is a spray housing, which defines a spray chamber. The material stream passes through a volume created by a portion of the mix chamber that is in fluid communication with the spray chamber. A nozzle, connected to a liquid additive line and an air line, is coupled to the spray housing. The nozzle creates a fog of liquid additive in the spray chamber and in a volume of the mix chamber adjacent the spray chamber. The fog of liquid additive gets deposited on the material stream. As the material continues through the mix chamber, the actuating device mixes the additive into the feed stream.

DETAILED DESCRIPTION OF THE PREFERRED EMBODIMENTS

Figure 1:
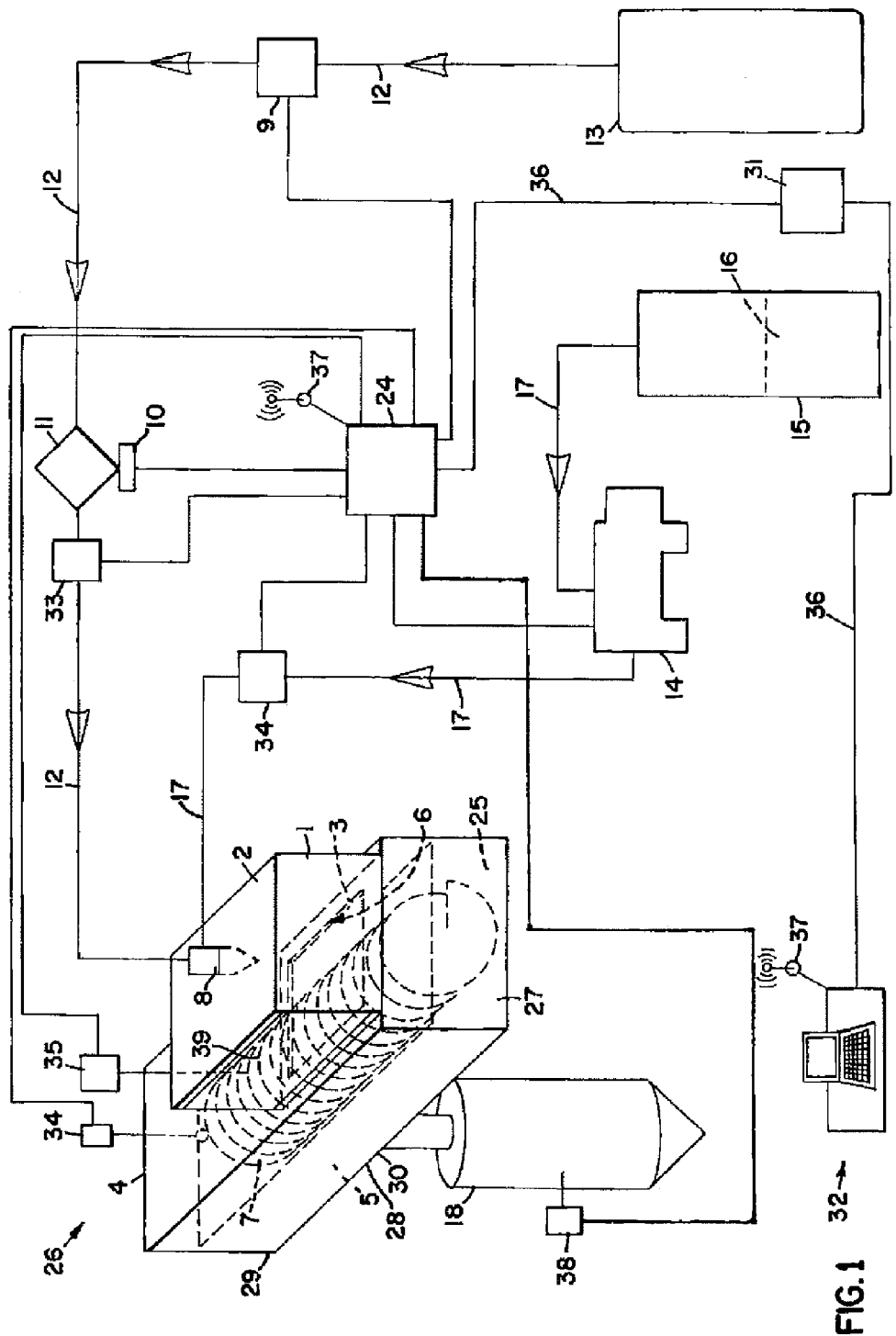
FIG. 1 is a diagram of an embodiment made according to the principles of the present disclosure.
Figure 2:
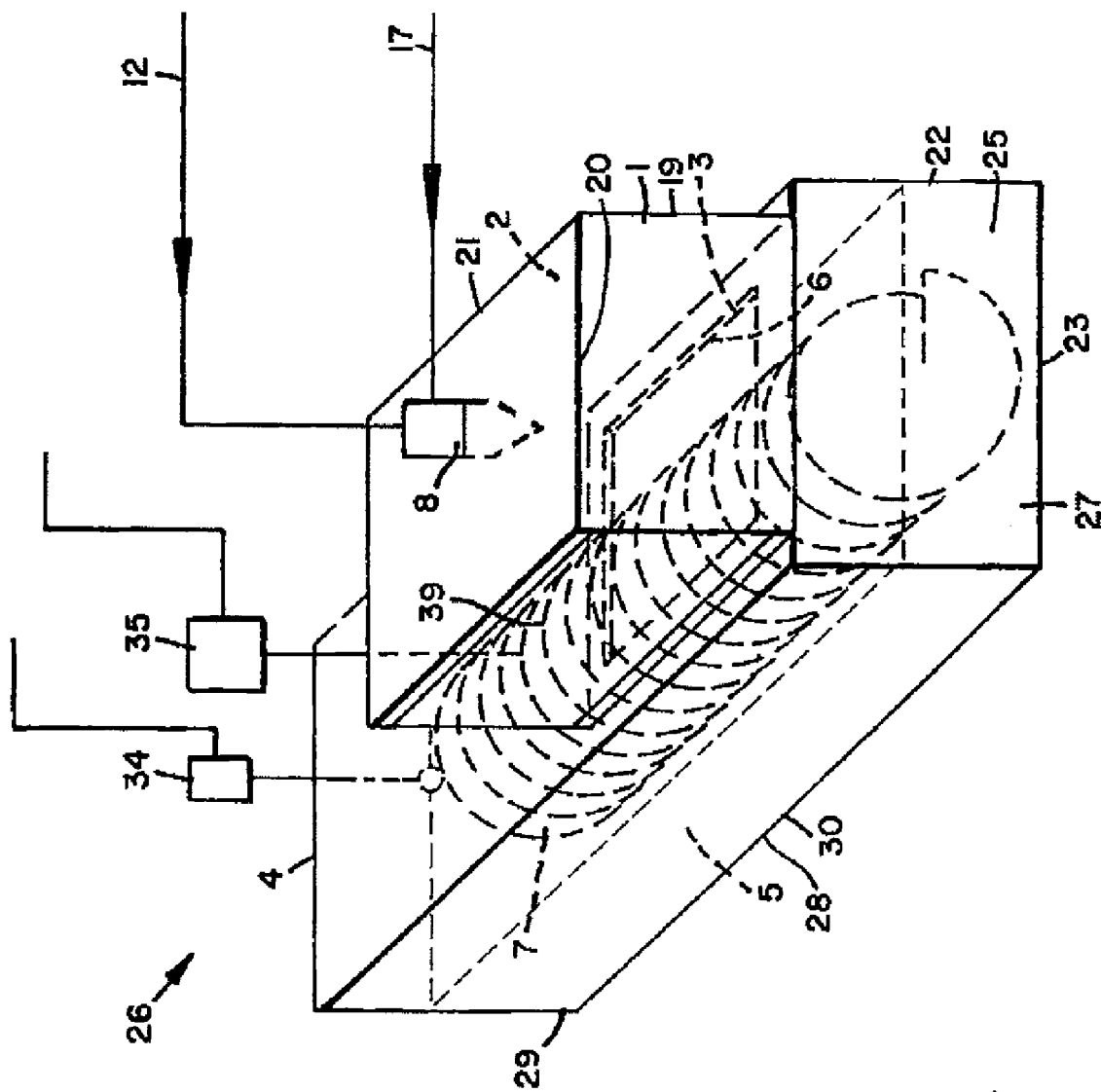
FIG. 2 is an enlarged view of a portion of FIG. 1.

Referring now to the drawings in which similar elements are numbered identically throughout, descriptions of embodiments constructed according to the principles of the present disclosure are provided. Referring now to FIGS. 1 and 2, the system 26 generally includes, among other elements described below, an air source 13, an additive tank 15, an additive pump 14, additive line 17 and air line 12, a spray nozzle 8, a spray housing 1, a mix housing 4, an actuating device 7 and a control unit 24.

FIGS. 1 and 2 illustrate one embodiment of a mix housing 4 made according to the principles of the present disclosure. The mix housing 4 defines a mix chamber 5 and a mix chamber opening 6. The mix housing 4 is used to transport material from one point in a feed processing plant to another point in the feed processing plant. Inside the mix chamber 5 is an actuating device 7. While inside the mix housing 4, the material stream 25 is progressed through the mix chamber 5 and mixed by the actuating device 7. The actuating device 7 can be anything capable of moving and mixing the material stream 25 through the mix chamber 5. For example, the actuating device 7 could be an auger. The auger can be any of a number of commercially available augers; it can also include mixing bars that help mix the material stream 25 as it passes through the mix chamber 5 such that the additive 16 is deposited on the material stream 25. Alternatively, the actuating device 7 can be a conveyor, rotating drum, or any other device that moves the material stream 25 through the mix chamber 5. The actuating device may optionally be manually controlled or automated by connecting it to a control unit 24, which monitors and regulates the flow rate of the material stream 25 by adjusting the speed of the actuating device 7.

The mix housing 4 has a length 30, a width 23 and a height 22. The length 30 can be any operable length required to move the material stream 25 from one point in the process to another. The length 30 has a first end 27, a midsection 28, and a second end 29. The material stream 25 enters the mix housing 4 at the first end 27 and exits the mix housing 4 at the second end 29. In one embodiment, mix housing 4 has a width 23 ranging from 1 foot to 8 feet. In another embodiment, mix housing 4 has a width 23 that ranges between about 2 feet and 5 feet. In yet another embodiment, the mix housing 4 has a width 23 of about 3 feet. In another embodiment, the mix housing 4 has a height 22 that ranges between about 1 and 5 feet. In another embodiment, the mix housing 4 has a height 22 that ranges between about 1.5 and 3.5 feet. In yet another embodiment, the mix housing 4 has a height 22 of about 2 feet.

The mix housing 4 constructed according to the principles of the present disclosure can have many different shapes. For example, the mix housing 4 can be rectangular, trapezoidal, tubular, cylindrical, U-shaped, or any other shape that can define a mix chamber 5. The mix housing 4 can also be constructed from any suitable material. Such materials would be recognized by those skilled in the art and chosen depending on the specific requirements of the system. For example, however, the mix housing could be made of plastic, metal, fiberglass, composite material, wood or any other suitable material.

Referring now to FIGS. 1 and 2, an embodiment of a spray housing 1 made according to the principles of the present disclosure is described. The spray housing 1 is located adjacent the mix housing 4. The spray housing 1 defines a spray chamber 2 and a spray chamber opening 3. The spray housing 1 is placed adjacent the mix housing 4 such that the spray chamber opening 3 and the mix chamber opening 6 provides fluid communication between the spray chamber 2 and the mix chamber 5. In one embodiment, the spray chamber opening 3 is about equal to and corresponds in shape to the mix chamber opening 6. Alternatively, the spray chamber opening 3 can be larger than mix chamber opening 6, or the spray chamber opening 3 can be smaller than the mix chamber opening 6, and they do not have to have corresponding shapes.

In one embodiment, the spray housing 1 is a rectangular box having a length 21, a height 19 and a width 20. In one embodiment the length of the spray housing 1 can range from about one half foot to 8 feet. In another embodiment, the length 21 of the spray housing 1 is between about 1 and 5 feet. In another embodiment, the length 21 of the spray housing 1 is between about 2 to 4 feet. In yet another embodiment, the length 21 of the spray housing 1 is about 3 feet. The width 20 of the spray housing 1 in one embodiment, ranges between about 1 foot and 5 feet. In another embodiment, the width 20 of the spray housing 1 ranges between about 1 foot and 2 feet. And in yet another embodiment, the width 20 of the spray housing 1 is about one and a half feet. The height 19 of the spray housing 1 can be selected in combination with the spray nozzle 8 so the spray exiting the spray nozzle 8 covers material stream 25. The height 19 of the spray housing 1, in one embodiment, ranges between about a half of a foot and 4 feet. In another embodiment, the height 19 of the spray housing 1 ranges between about 1 to 3 feet. In yet another embodiment, the height 19 of the spray housing 1 is about 1 to 2 feet.

The spray housing 1 made according to the principles of the present disclosure may be made of many different materials. For example, the spray housing 1 may be made of metal, plastic, fiberglass, composite material, wood or a combination of materials. The spray housing 1 may also be many different shapes. For example, the spray housing 1 may be rectangular, triangular, trapezoidal, U-shaped, spherical, tubular, or any other shape that can define a spray chamber 2. In another embodiment, the spray housing may include a spray housing door 39, which provides access to the spray chamber 2.

Spray housing 1 is located adjacent the mix housing 4 such that the liquid additive 16 is deposited onto the material stream 25 early enough to allow material stream 25 sufficient time to mix in the mix chamber 5. In one embodiment constructed to the principles of the present disclosure, spray housing 1 is located adjacent the mix housing 4 between the first end 27 and the midsection 28 of the mix housing 4. While, it should be noted that the spray housing 1 can be located anywhere adjacent the mix housing 4, it is preferred for the spray housing 1 to be positioned to allow the material stream 25 to be sufficiently mixed in the mix chamber 5 before exiting the mix housing 4 at the second end 29.

In one embodiment, spray nozzle 8 is coupled to the spray housing 1 such that it sprays a mixture of air and liquid additive 16 through the spray chamber 2 and into the mix chamber 5 and gets deposited on the material stream 25. In an alternative embodiment, spray nozzle 8 could spray only a liquid additive 16. Alternatively, there could be a plurality of spray nozzles that spray the liquid additive 16, or a mixture of liquid additive and air, through the spray chamber 2 and into the mix chamber 5 onto the material stream 25. The type of spray nozzle 8 used can be any type of nozzle that produces a fine mist or fog that will substantially fill the volume of the mix chamber 5 adjacent the spray housing 1, such that the liquid additive 16 gets deposited on the material stream 25. In one embodiment of the present disclosure, the spray nozzle 8 uses is a "UNIJET 9510" made by Spraying Systems Company. In an embodiment made according to the principles of the present disclosure, the spray nozzle 8 provides a fan of liquid additive 16 having a width about the size of either the smaller of the spray chamber opening 3 or the mix chamber opening 6 when it reaches either opening. Alternatively, the spray nozzle 8 sprays a fan of air and liquid additive that is about the width of the material stream 25 passing through the mix chamber 5.

The spray or fog ejected from the spray nozzle 8, in one embodiment, has particle sizes ranging from 1 to 100 microns in diameter. In another embodiment, the particle size ejected from the spray nozzle can be from about 10 to 80 microns in diameter. In yet another embodiment, the particle size ejected from the spray nozzle 8 could be between about 30 and 50 microns in diameter.

Referring still to FIGS. 1 and 2, in one embodiment the material stream 25 passes through the mix chamber 5 adjacent the spray chamber 2. A mixture of air and liquid additive 16 are sprayed out of the spray nozzle 8 and deposited on the material stream 25. The material stream 25 continues moving through the mix housing 4 by way of the actuating device 7. The actuating device 7 mixes the material stream 25 and the liquid additive 16 prior to exiting the mix housing 4. Once the material stream 25 and liquid additive 16 are mixed, the material stream 25 can be further processed in a number of different ways. For example, the material stream 25 can enter steam chest 18 where it is cooked at between about 150 to 250 degrees Fahrenheit and steam flaked, the material stream can be dry rolled or any other process used to produce a feed product.

Referring now to FIGS. 1-4, the additive line 17 is connected to an additive pump 14, which in turn is connected to an additive tank 15. Additive tank 15 holds the liquid additive 16, which is pumped, via the additive pump 14, through additive line 17 to the air nozzle 8, where it is mixed with the air in the air line 12. Alternatively, the system may simply spry additive out the nozzle omitting the air. The liquid additive 16 can be any number of additives that are combined with feed. An example of a liquid additive may be SarStart®-LSC or SarTemp® made by SarTec® Corporation of Anoka, Minn., which are used to condition grain and increase feed efficiency in animals. Other additives may include vitamins, minerals, conditioners, supplements, medicines and micro ingredients.

In one embodiment, the chemical pump 14 is operatively connected to a control unit 24 such that the control unit 24 regulates the amount of additive 16 that the additive pump 14 provides to the spray nozzle 8. It will be apparent to one skilled in the art to select the appropriate equipment depending on the system requirements. Alternatively, the additive pump 14 can be manually adjusted to provide the required flow rate for a desired composition of additive 16 and material 25.

In one embodiment an air source 13 supplies the nozzle 8 with air connected through air line 12. An air filter 10, an air regulator 11, and a valve 9 can be connected between the air source 13 and the spray nozzle 8 along the air line 12. In one embodiment, the valve 9 and the air regulator 11 may be operatively connected to a control unit 24, which regulates the valve 9 and the air regulator 11 to control the air supply in the system 26. One skilled in this art can select the appropriate equipment depending on whether the system 26 is automated or manually controlled. For example, in an automated system, valve 9 could be a solenoid valve. The flow parameters of the system 26 are determined based upon the desired composition of the material stream 25. It will be apparent to one skilled in the art how to manipulate these parameters according to the desired composition of the material stream 25. Alternatively, valve 9 and air regulator 11 can be manually adjusted.

Additionally, the control unit 24 could also include a computer 31, including a modem, capable of monitoring, recording, controlling, and displaying the system parameters, such as, flow rates, temperatures, volumes, pressures and concentrations. In this example embodiment, the control unit 24 could be operatively connected to the air regulator 11, a valve 9, an air flow meter 33, an additive flow meter 34, the pump 14, a material stream meter 35, an additive concentration meter 34, the actuating device 7, and the steam chest thermometer 38. The control unit 24 could be operatively connected to a remote workstation 32, either via a wire 36 or wirelessly using transmitter/receiver devices 37. From the workstation 32 the operator could monitor the system parameters in real time, or review stored values to determine what certain parameters were at any given time. An example of such a system is described in U.S. Pat. No. 5,347,468, issued to Rupp et al, is incorporated by reference into this disclosure.

Figure 3:
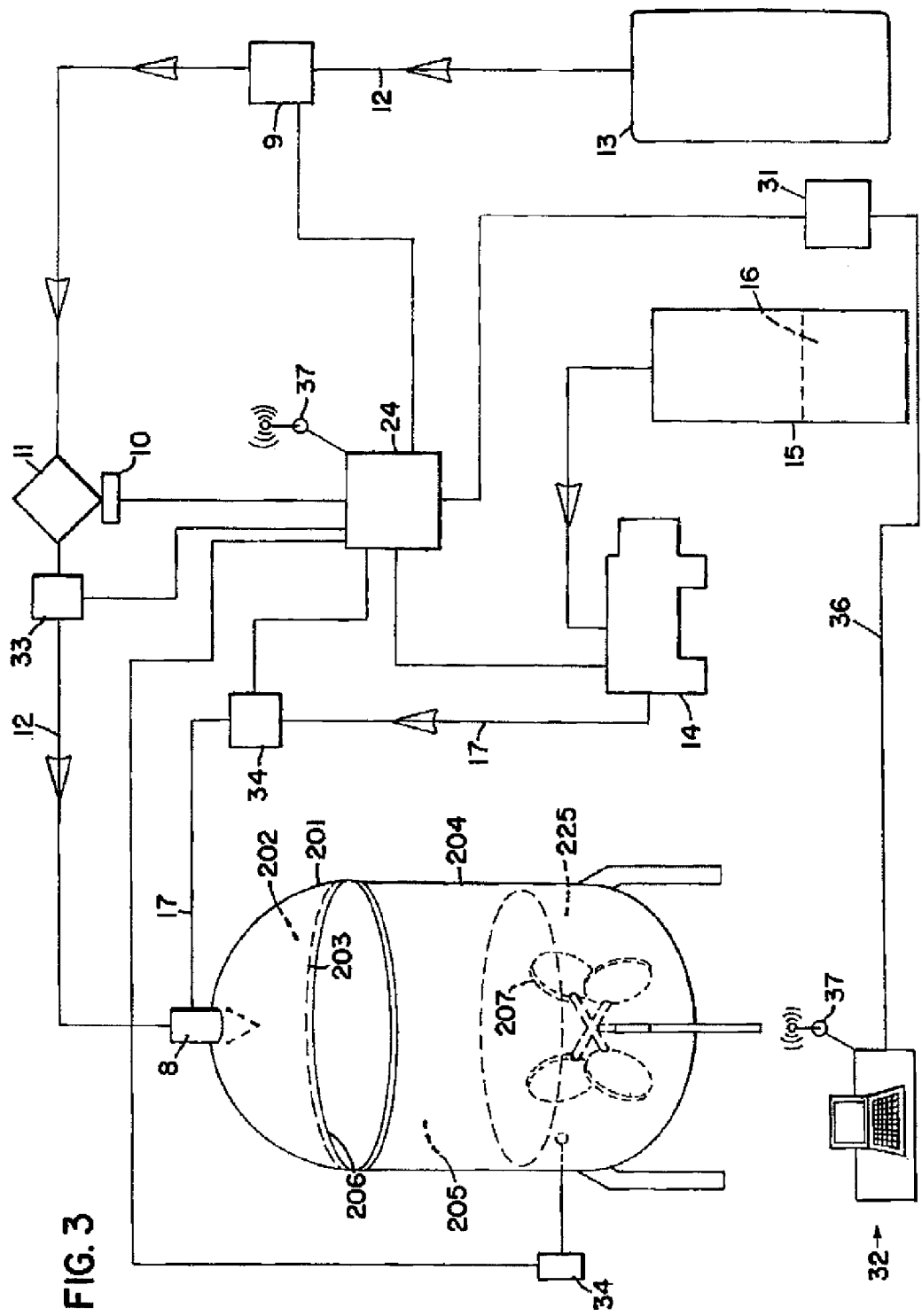
FIG. 3 is a diagram of another embodiment made according to the principles of the present disclosure.
Figure 4:
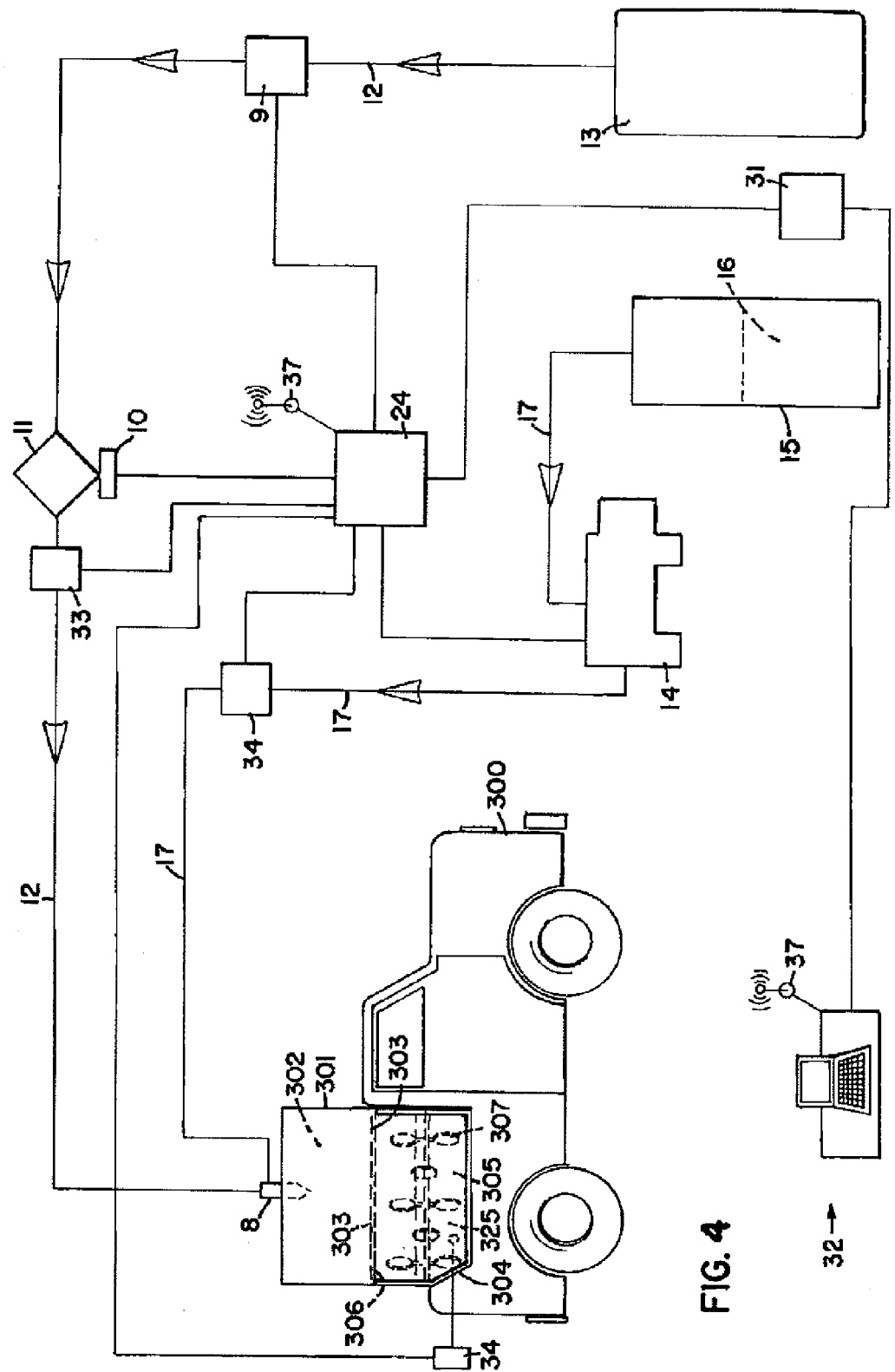
FIG. 4 is a diagram of another embodiment made according to the principles of the present disclosure.

Referring now to FIG. 3, FIG. 3 illustrates an embodiment made according to the principles of the present disclosure. FIG. 3 shows a mix housing 204, having an actuating device 207 to mix the batch material 225. The mix housing 204 defines a mix chamber 205 and a mix chamber opening 206, which provides access to the interior of the mix housing 204 and the batch material 225. Adjacent the mix housing 204 is a spray housing 201 defining a spray chamber 202 and a spray chamber opening 203. In this embodiment the spray housing 201 is spherical to fit over the mix housing 204 such that the mix chamber opening 206 and the spray chamber opening 203 provide fluid communication between the spray chamber 202 and the mix chamber 205. Alternatively, the spray housing 201 made according to the principles of the present disclosure may be made of many different materials, and also may also be many different shapes and appropriate sizes. In another embodiment, the spray housing 201 may hinge onto the mix housing 204 such that it provides access to the mix chamber 205 to fill the mix chamber 205 with batch material 225. Alternatively, the spray housing 201 could be removable, or the batch material 225 could be added into the mix chamber 205 through an opening (not shown) in the mix housing 204 designed to receive the batch material 225.

In one embodiment, a nozzle 8 is coupled to the spray housing 201. The nozzle 8 creates a fog of a mixture of air and additive 16 in the spray chamber 202. The fog travels through the spray chamber opening 203, the mix chamber opening 206, and into the mix chamber 205 such that it is deposited onto the batch material 225 as the actuating device 207 mixes the batch material 225. The actuating device 207 can be a mixing paddle(s) or any type of mixing apparatus used in a mix housing 204 known to one skilled in the art to sufficiently mix the batch material 225 such that the fog of air and liquid additive 16 is sufficiently mixed into the batch material 225. It should be recognized that the parameters of the spray housing 201, such as the material out of which it is made and its shape are similar to the spray housing 1 described above. The size of the spray housing 201 can be any appropriate size, which would be apparent to one skilled in the art, depending on the application for which it is to be used. In choosing the size, one skilled in the art should consider the length, width and height of the spry housing 201 and the mix housing 204 along with the spray nozzle 8. Such elements should be chosen such that the additive 16 is deposited uniformly onto the batch material 225 as the batch material 225 is mixed.

Referring now to FIG. 4, FIG. 4 illustrates yet another embodiment of the present disclosure. FIG. 4 illustrate a spray housing 301 positioned such that a mix truck 300 can be driven under the spray housing 301. The mix truck 300 contains a mix housing 304. The mix housing 304 defines a mix chamber 305 and a mix chamber opening 306 that provides access to the interior of the mix housing 304 and the batch material 325. Adjacent the mix housing 304 is a spray housing 301 defining a spray chamber 302 and a spray chamber opening 303. In this embodiment the spray housing 301 is rectangular to fit over the mix housing 304 such that the mix chamber opening 306 and the spray chamber opening 303 provide fluid communication between the spray chamber 302 and the mix chamber 305. It should be recognized that the parameters of the spray housing 301, such as the material out of which it is made and its shape are similar to the spray housing 1 described above. Additionally, one skilled in the art would know how to choose the dimensions of the spray housing 301 according to the application for which it is to be used in according with the principles of the present disclosure.

In another embodiment, a nozzle 8 is coupled to the spray housing 301. The nozzle 8 creates a fog of a mixture of air and additive 16 in the spray chamber 302. The fog travels through the spray chamber opening 303, the mix chamber opening 306, and into the mix chamber 305 such that it is deposited onto the batch material 325 as the actuating device 307 mixes the batch material 325. The actuating device 307 can be a mixing paddle(s) or any type of mixing apparatus used in a mix housing 304 known to one skilled in the art to sufficiently mix the batch material 325 such that the fog of air and liquid additive 16 is mixed into the batch material 325. The remaining elements in FIG. 4 are described in detail above.

It is to be understood that even though numerous characteristics and advantages of various embodiments of the present disclosure have been set forth in the foregoing description, together with the details of the structure and the function of various embodiments of the disclosure, this disclosure is illustrative only and changes may be made in details, especially in matters of shape, size and arrangement and parts within the principles of the present disclosure, to the full extent indicated by the broad general meaning of the terms in which the appended claims are expressed.

What is claimed:

1. A system for processing a stream of livestock feed, the system comprising:
- a pump operatively connected to an additive tank and in fluid communication with a spray nozzle to move liquid additive from the additive tank to the spray nozzle;
- a mix housing defining a mix chamber and a mix chamber opening, the mix chamber opening providing access to the interior of the mix chamber, the mix housing comprising a first end, a midsection, and a second end;
- an actuating device disposed within the mix chamber, the actuating device configured to move the stream of livestock feed from the first end to the second end of the mix housing;
- a spray housing defining a spray chamber and a spray chamber opening, the spray housing coupled to the mix housing between a midsection of the mix housing and a first end of the mix housing, the spray chamber in fluid communication with the mix chamber through the mix chamber opening and the spray chamber opening;
- the spray nozzle configured to spray a fog of liquid additive into the spray chamber, which passes through the spray chamber opening and the mix chamber opening into the mix chamber and deposits onto the stream of livestock feed as it passes through the mix chamber;
- a steam chest comprising a steam chest housing, the steam chest housing in fluid communication with the mix housing; and
- a steam chest thermometer configured to measure the temperature within the steam chest housing.

2. The system of claim 1, the steam chest housing in fluid communication with the second end of the mix housing.

3. The system of claim 1, the steam chest configured to maintain a temperature of between about 150 to 250 degrees Fahrenheit within the steam chest housing.

4. The system of claim 1, further comprising a control unit, the control unit configured to regulate the amount of additive that the pump moves to the spray nozzle.

5. The system of claim 4, the control unit configured to adjust the speed of the actuating device.

6. The system of claim 4, the control unit comprising a computer.

7. The system of claim 6, the computer configured to monitor, record, and display system parameters selected from the group consisting of flow rates and temperatures.

8. The system of claim 7, the computer connected to a remote workstation, the workstation configured to display system parameters in real time.

9. The system of claim 1, wherein the nozzle is arranged to produce a spray of a mixture of the liquid additive and air to substantially cover the stream of livestock feed with the liquid additive.

10. The system of claim 1, wherein the actuating device is an auger.

11. The system of claim 1, the spray nozzle configured to spray a fog of air and liquid additive into the spray chamber, the fog comprising droplets with a diameter of about 1 to 100 microns.

12. The system of claim 1, wherein the spray housing is located sufficiently close to the first end of the mix housing to allow the liquid additive to be uniformly distributed onto the stream of livestock feed.

13. The system of claim 1, further comprising an air source in fluid communication with the spray nozzle.

14. A system for processing a stream of livestock feed, the system comprising:
- a pump operatively connected to an additive tank and in fluid communication with a spray nozzle to move liquid additive from the additive tank to the spray nozzle;
- a mix housing defining a mix chamber and a mix chamber opening, the mix chamber opening providing access to the interior of the mix chamber, the mix housing comprising a first end, a midsection, and a second end, the mix housing coupled to a mix truck;
- an actuating device disposed within the mix chamber, the actuating device arranged to move the stream of livestock feed from the first end to the second end of the mix housing;
- a spray housing defining a spray chamber and a spray chamber opening, the spray housing configured to be positioned over the mix housing, the spray housing detached from the mix truck, the spray chamber in fluid communication with the mix chamber through the mix chamber opening and the spray chamber opening; and
- the spray nozzle configured to spray a fog of liquid additive into the spray chamber, which passes through the spray chamber opening and the mix chamber opening into the mix chamber and deposits onto the stream of livestock feed as it passes through the mix chamber.

15. The system of claim 14, further comprising a control unit, the control unit configured to regulate the amount of additive that the pump moves to the spray nozzle.

16. The system of claim 15, the control unit comprising a computer.

17. The system of claim 14, wherein the actuating device is an auger.

18. The system of claim 14, the say nozzle configured to spray a fog of air and liquid additive into the spray chamber, the fog comprising droplets with a diameter of about 1 to 100 microns.

* * * * *